US012034516B2

(12) United States Patent
Lee et al.

(10) Patent No.: US 12,034,516 B2
(45) Date of Patent: Jul. 9, 2024

(54) IN-HOUSE RELAY DEVICE AND SUPPORT EQUIPMENT FOR SUPPORTING SAME

(71) Applicant: Samsung Electronics Co., Ltd., Gyeonggi-do (KR)

(72) Inventors: Seunghwan Lee, Gyeonggi-do (KR); Woojong Cho, Gyeonggi-do (KR); Heeyoung Kim, Gyeonggi-do (KR); Kyungsup Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 17/669,500

(22) Filed: Feb. 11, 2022

(65) Prior Publication Data

US 2022/0166491 A1 May 26, 2022

Related U.S. Application Data

(63) Continuation of application No. PCT/KR2020/010217, filed on Aug. 3, 2020.

(30) Foreign Application Priority Data

Aug. 13, 2019 (KR) .................. 10-2019-0099083

(51) Int. Cl.
*H04B 7/155* (2006.01)
*H01Q 1/00* (2006.01)
*H04W 52/30* (2009.01)

(52) U.S. Cl.
CPC ............. *H04B 7/155* (2013.01); *H01Q 1/007* (2013.01); *H04W 52/30* (2013.01)

(58) Field of Classification Search
CPC .......................... H04B 7/155; H04B 7/15507; H04B 7/15528; H04B 7/14; H04B 7/15; H04W 52/30
See application file for complete search history.

(56) References Cited

U.S. PATENT DOCUMENTS 5,003,320 A    3/1991  Miranda
6,467,745 B1 * 10/2002 Sickels .................. H04R 1/026
                                                    248/242

(Continued)

FOREIGN PATENT DOCUMENTS

KR      20-0330441 Y1    10/2003
KR      20-0440901 Y1     7/2008

(Continued)

OTHER PUBLICATIONS

English translation of JP-2013005082-A Nishizawa Jan. 2013 (Year: 2013).*

*Primary Examiner* — Keith Ferguson
(74) *Attorney, Agent, or Firm* — Cha & Retier, LLC

(57) ABSTRACT

Certain embodiments of the present invention relate to an in-house relay device capable of 5G wireless communication and support equipment for supporting same, the support equipment comprising: a vertical rod installed in a z-axis direction from the bottom surface; a support member disposed at one end of the vertical rod to be coupled to the vertical rod, and supporting the in-house relay device; and a fixing member coupled to the support member and fixing the support member in a direction of a permeable outer wall, wherein the support member may comprise a rotating plate for adjusting a direction of the in-house relay device.

13 Claims, 17 Drawing Sheets

(56) References Cited

U.S. PATENT DOCUMENTS

| | | | | |
|---|---|---|---|---|
| 8,320,595 | B2* | 11/2012 | Tschirpke | H04R 1/025 |
| | | | | 381/345 |
| 8,439,322 | B2* | 5/2013 | Skudin | H01Q 1/1242 |
| | | | | 248/676 |
| 2010/0103868 | A1 | 4/2010 | Meng et al. | |
| 2012/0062424 | A1 | 3/2012 | Hwang | |
| 2014/0151516 | A1* | 6/2014 | Liu | H04R 1/026 |
| | | | | 248/124.1 |
| 2016/0380355 | A1 | 12/2016 | Lysejko et al. | |
| 2019/0045346 | A1* | 2/2019 | Macieira | H04W 72/02 |

FOREIGN PATENT DOCUMENTS

| | | |
|---|---|---|
| KR | 20-2010-0001924 U | 2/2010 |
| KR | 10-2012-0028280 A | 3/2012 |
| KR | 20-2013-0005647 U | 9/2013 |

* cited by examiner

IN-HOUSE RELAY DEVICE AND SUPPORT EQUIPMENT FOR SUPPORTING SAME

CROSS-REFERENCE TO RELATED APPLICATION(S)

This application is a continuation of International Application No. PCT/KR2020/010217, filed on Aug. 3, 2020, which claims priority to Korean Patent Application No. 10-2019-0099083, filed on Aug. 13, 2019 in the Korean Intellectual Property Office, the disclosures of which are herein incorporated by reference.

TECHNICAL FIELD

One or more embodiments of the disclosure relate to an in-house relay device capable of 5G wireless communication, and a support equipment supporting the same.

BACKGROUND

To meet the demand for high wireless data traffic since the deployment of 4G communication systems, efforts have been made to develop an improved 5G or pre-5G communication system, which is also known as a "Beyond 4G Network" communication system or a "Post LTE" system.

The 5G communication system is implemented in ultra-higher frequency (mmWave) bands (e.g., 28 GHz or 39 GHz bands) and in 6 GHz or lower bands so as to provide higher data rates.

5G communication systems have the advantage of high data transmission rates when compared to previous communication networks (for example, 2G, 3G, 4G, or long term evolution (LTE) networks).

In upcoming 5G environment, there has been increasing interest in technologies for connecting home appliances via networks, and many technologies have been developed to connect and manage home appliances to an external device (for example, server of operator network) through the Internet.

SUMMARY

Certain embodiments of the disclosure may provide an in-house relay device (for example, a consumer premises equipment) capable of 5G wireless communication, and a support equipment capable of installing the same in a house quickly and stably.

A support equipment for fixing an in-house relay device, which wirelessly communicates with a repeater of a wireless communication service provider in an ultra-high frequency (mmWave) band according to certain embodiments may include a vertical rod in a substantially vertical orientation, a support member disposed at one end of the vertical rod to be coupled to the vertical rod and supporting the in-house relay device, and a fixing member coupled to a portion of the support member and fixing the support member in a direction of a permeable outer wall, wherein the support member may include a rotating plate for adjusting a direction of the in-house relay device.

An in-house relay device according to certain embodiments may include an in-house relay device configured to perform wireless communication with a repeater of a wireless communication service provider in an ultra-high frequency (mmWave) band, and a support equipment configured to fix the in-house relay device, wherein the support equipment includes a vertical rod in a substantially vertical orientation, a support member configured to be disposed at one end of the vertical rod to be coupled to the vertical rod, and to support the in-house relay device, and a fixing member configured to be coupled to the support member and to fix the support member in a direction of a permeable outer wall, the support member including a rotating plate for adjusting a direction of the in-house relay device.

Certain embodiments of the disclosure may provide an in-house relay device capable of 5G wireless communication, and a support equipment capable of installing the same in a house such that in-house information home appliances can access the Internet by using a 5G communication system having a high data transmission rate.

According to certain embodiments of the disclosure, provide an in-house relay device capable of 5G wireless communication can be installed easily and conveniently without being aided by a professional (for example, installation technician), and the in-house relay device can be stably fixed.

DETAILED DESCRIPTION

Figure 1:
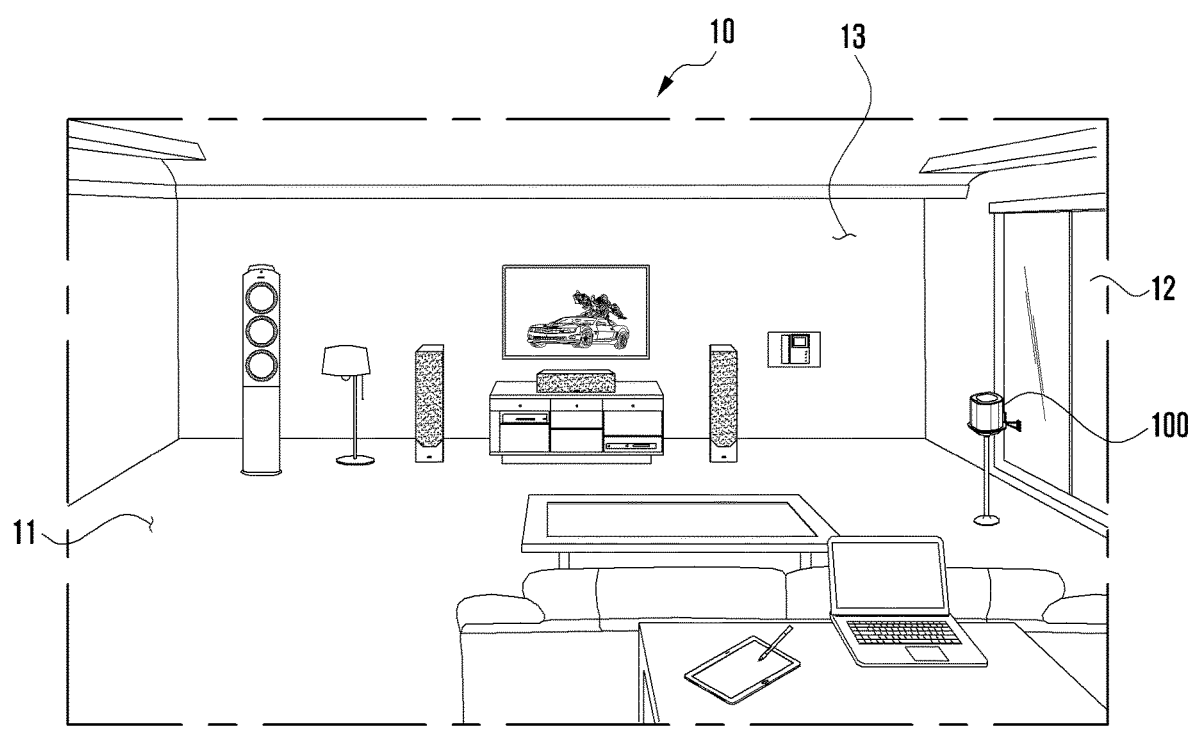
FIG. 1 is an example showing an in-house environment according to certain embodiments of the disclosure.
Figure 2:
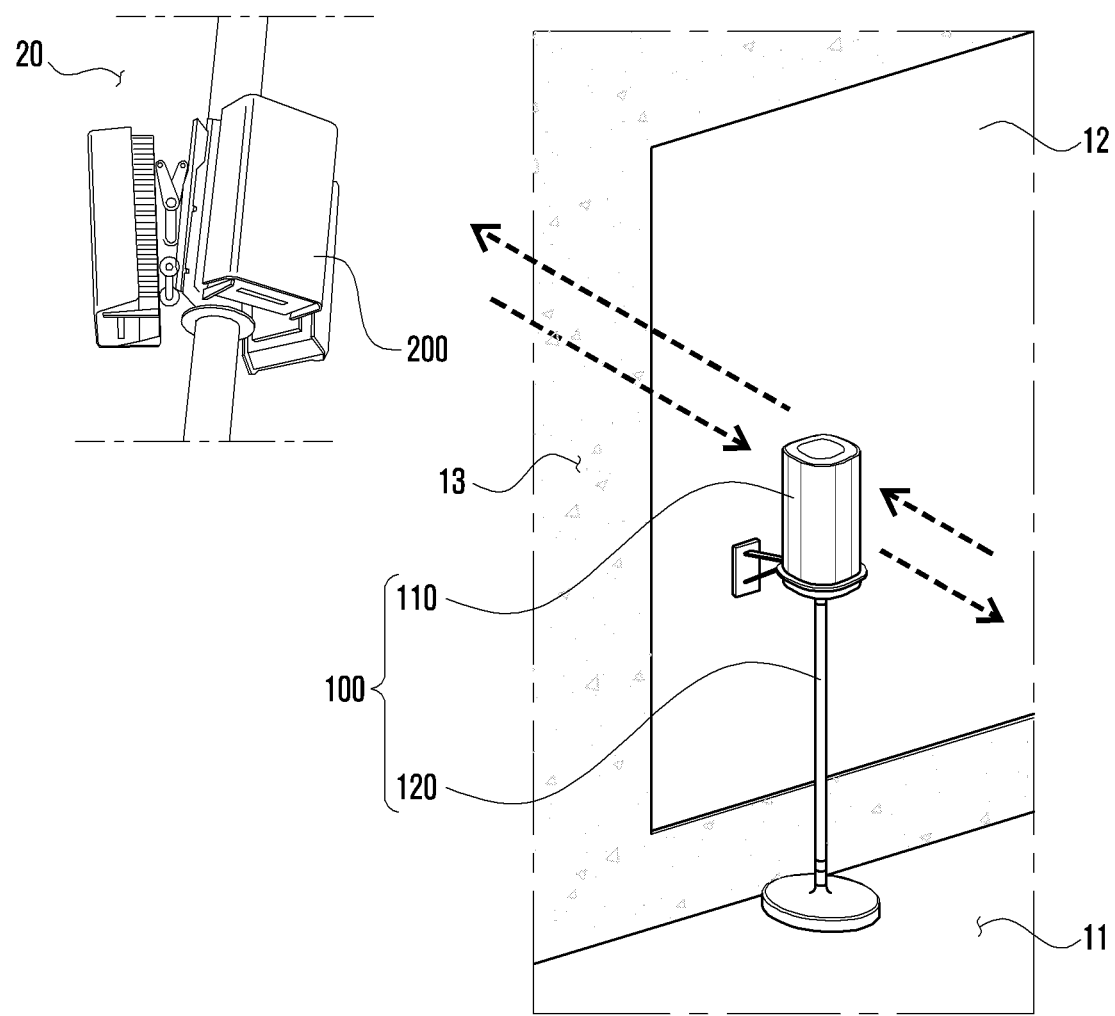
FIG. 2 is a conceptual view illustrating an in-house relay device shown in FIG. 1.

FIG. 1 is an example showing an in-house environment according to certain embodiments of the disclosure. FIG. 2 is a conceptual view illustrating an in-house relay device 110 shown in FIG. 1.

Referring to FIGS. 1 and 2, a permeable outer wall 12 may be disposed in an in-house environment, for example, a living room of a home, and an in-house relay device (for example, a consumer premises equipment) 100 may be installed facing the permeable outer wall 12. According to certain embodiments, the permeable outer wall 12 refers to an area through which a signal of an ultra-high frequency band passes relatively better than other areas among side wall or outer wall areas, and most preferably, the permeable outer wall 12 may be a window area made of a glass material. According to certain embodiments, the permeable outer wall 12 is not limited to a window made of a glass material, and may include an area made of a high frequency transmissive material such as plastic, wood, paper, or fiber. According to certain embodiments, the in-house relay device 100 may include an in-house relay device 110 and a support equipment 120 for providing the in-house relay device 110 in a living quater. The support equipment 120 is an installation device which helps a user (e.g., a customer) to self-install the in-house replay device 110 without the help of an expert (e.g., an installer), and may serve to support the in-house relay device 110 after being installed. The term "support equipment 120" used in this disclosure may be also referred to as a support equipment, installation equipment, or support assembly.

According to certain embodiments, the in-house relay device 110 may be supported by the support equipment 120, and the support equipment 120 may have a rod shape extending in a vertical direction from a bottom surface 11 when placed at indoors 10.

According to certain embodiments, the in-house relay device 110 is a device capable of 5G wireless communication, and may communicate with a repeater 200 of a wireless communication service provider installed at outdoors 20 using an ultra-high frequency (mmWave) band (e.g., 28 GHz or 39 GHz), or Sub6 (e.g., 6 GHz or less). The in-house relay device 110 according to certain embodiments may be installed to face the permeable outer wall 12 in order to perform wireless communication in an ultra-high frequency (mmWave) band. For example, since communication in the ultra-high frequency (mmWave) band may not be performed without interruptions when the in-house repeater 110 is installed to face a wall surface 13 instead of the permeable outer wall 12, the in-house relay device 110 may be installed in relation to the permeable outer wall 12.

The in-house relay device 110 according to certain embodiments may serve to relay communication between the repeater 200 of the wireless communication service provider and information home appliances (e.g., a TV, a refrigerator, a washing machine, a vacuum cleaner, a smartphone, or a tablet PC) located indoors 10, and may communicate with the repeater 200 of the wireless communication service provider using wireless communication (e.g., 5G wireless communication or a legacy network). According to an embodiment, the wireless communication between the in-house relay device 110 and the repeater 200 of the wireless communication service provider may be 5G communication or a legacy network including communication before 5G communication, for example, a second generation (2G), 3G, 4G, or long-term evolution (LTE) network. According to an embodiment, the 5G communication may be communication using an ultra-high frequency (mmWave) band (e.g., 28 GHz or 39 GHz) or a Sub6 (6 GHz or less) band.

According to certain embodiments, the in-house relay device 110 may serve as a wired/wireless router connecting the information home appliances in indoors 10 to the Internet network. For example, the in-house relay device 110 according to an embodiment may communicate with the information home appliances in indoors 10 using wired communication (e.g., local area network (LAN) communication) or wireless communication (e.g., Wi-Fi or Bluetooth), and may support the information home appliances provided indoors 10 to access the Internet network. According to certain embodiments, by providing the in-house relay device 110 capable of 5G wireless communication and the support equipment 120 capable of installing the in-house relay device 110 indoors 10, the indoor information home appliances can be connected to the Internet network using a 5G communication system having a high data rate.

A support equipment (e.g., 120 of FIG. 3) for fixing an in-house relay device (e.g., 110 in FIG. 3) that wirelessly communicates with a repeater of a wireless communication service provider in an ultra-high frequency (mmWave) band according to certain embodiments may include a vertical rod (e.g., 410 of FIG. 3) installed in a z-axis direction from the bottom surface; a support member (e.g., 420 of FIG. 3) disposed at one end of the vertical rod to be coupled to the vertical rod 410 and supporting the in-house relay device 110; and a fixing member (e.g., 430 of FIG. 3) coupled to a portion of the support member 420 and fixing the support member 420 in a direction of a permeable outer wall, wherein the support member may include a rotating plate for adjusting a direction of the in-house relay device 110. The support member 420 may include a base plate, a first fixing plate loaded on the base plate, the rotating plate loaded on the first fixing plate, and a second fixing plate loaded on the rotating plate and coupled to the bottom surface of the in-house relay device 110. A first knob for rotating the rotating plate about the z-axis direction may be provided on a side surface of the first fixing plate, and a second knob for rotating the rotating plate about an x-axis direction perpendicular to the z-axis direction may be provided on a side surface of the second fixing plate. A first toothed rail coupled to a first gear of the first knob in a male and female coupling manner may be provided on a bottom surface of the rotating plate facing the first fixing plate, and a second toothed rail coupled to a second gear of the second knob in a male and female coupling manner may be provided on an upper surface of the rotating plate facing the second fixing plate. The upper surface of the rotating plate may include a groove having a semi-circular column shape and disposed in the x-axis direction, and the second toothed rail may include a plurality of peaks and valleys provided on the surface of the groove, wherein the plurality of peaks and valleys may be provided in the x-axis direction. A protrusion may be provided on an upper surface of the support member 420 facing the bottom surface of the in-house relay device 110, and the protrusion may be coupled to any one of a plurality of insertion grooves provided on the bottom surface of the in-house relay device 110. The support member 420 may include a base plate, a titling plate loaded on the base plate and having the protrusion provided thereon and coupled to the bottom surface of the in-house relay device 110, and a rotating plate loaded on the tilting plate and having a ring shape surrounding a lower side surface of the in-house relay device 110. A protrusion may be provided on an upper surface of the tilting plate facing the rotating plate, and a plurality of steps coupled to the protrusion and having different heights may be provided on the bottom surface of the rotating plate facing the tilting plate. A handler for rotating the rotating plate may protrude from the upper surface of the rotating plate. A wall fixing unit and a rotating arm connecting the wall fixing unit to a portion of the vertical rod 410 may be further included in the fixing member. The fixing member 430 may include at least one bracket connected to a portion of the support member 420 and an attachment member for fixing the bracket to the permeable outer wall or the wall surface, and the attachment member may be any one of a double-sided tape, a clamp, or an air absorber. A through-hole through which a power line and a communication line connected to the in-house relay device 110 are installed may be provided inside the vertical rod 410. The vertical rod 410 may include an extension member for extending the length of the vertical rod 410 in the z-axis direction. At least one proximity sensor embedded in the support member 420 and a connection member electrically connecting the proximity sensor and the in-house relay device 110 may be further included in the in-house relay device.

Figure 3:
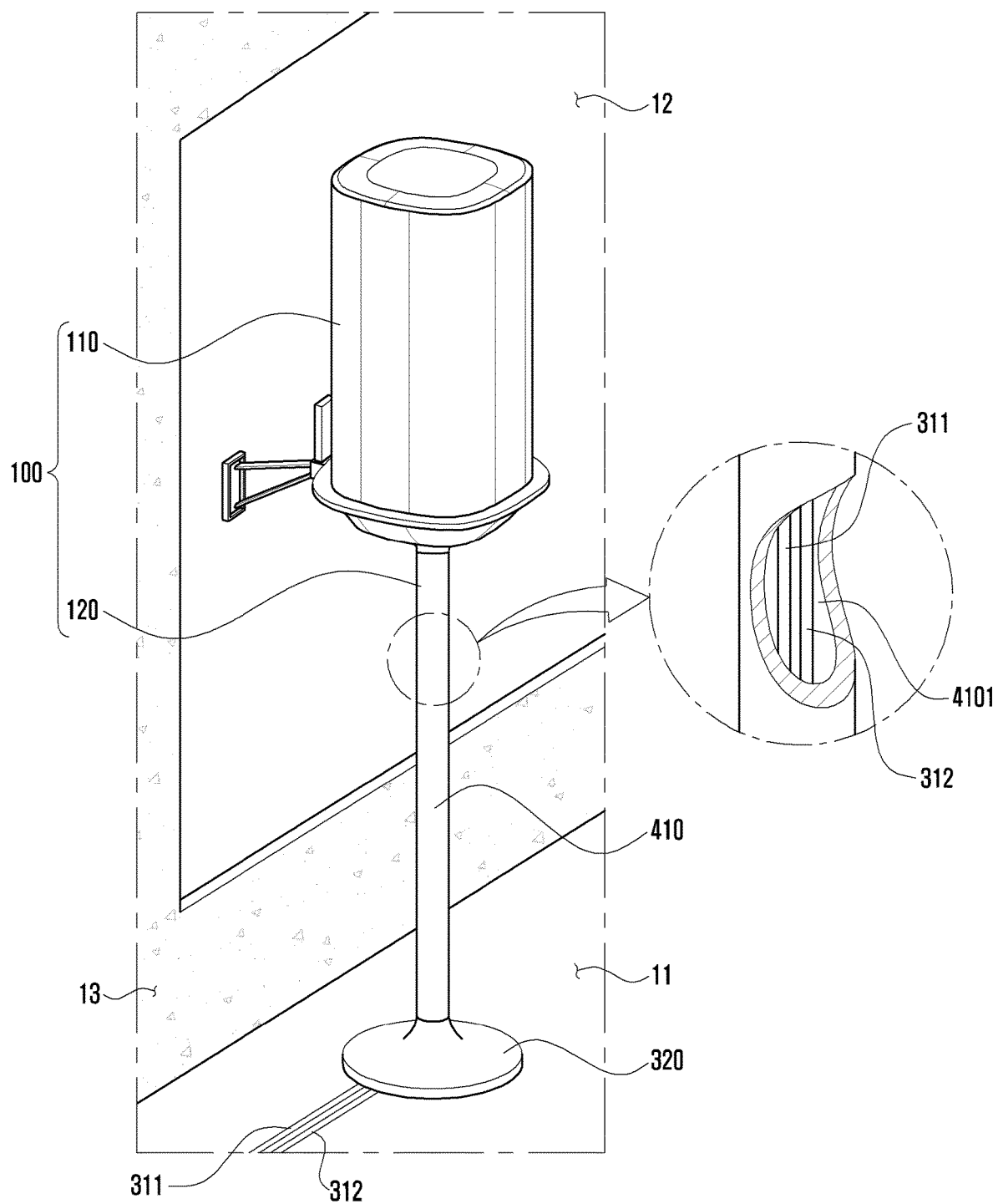
FIG. 3 is an exemplary view specifically illustrating an in-house relay device shown in FIG. 1.
Figure 4:
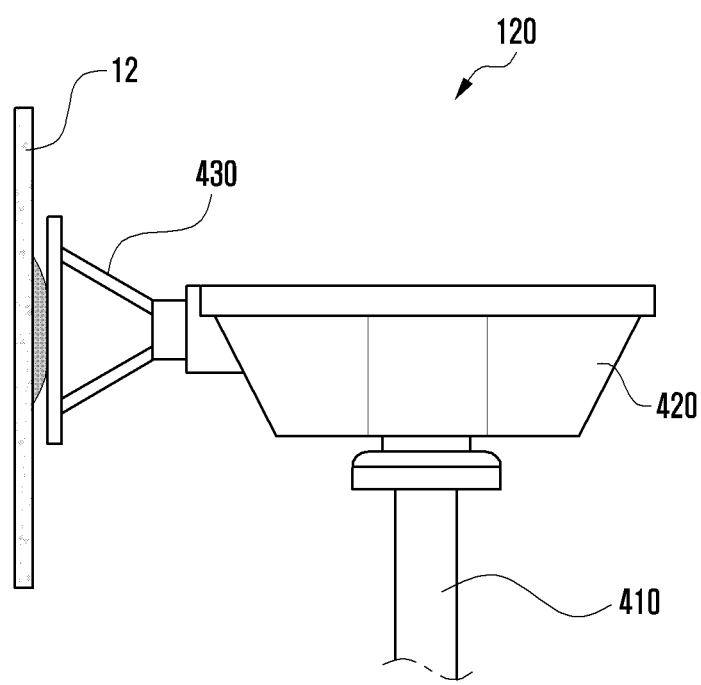
FIG. 4 is a cross-sectional view illustrating a support equipment according to certain embodiments as viewed from side.
Figure 5:
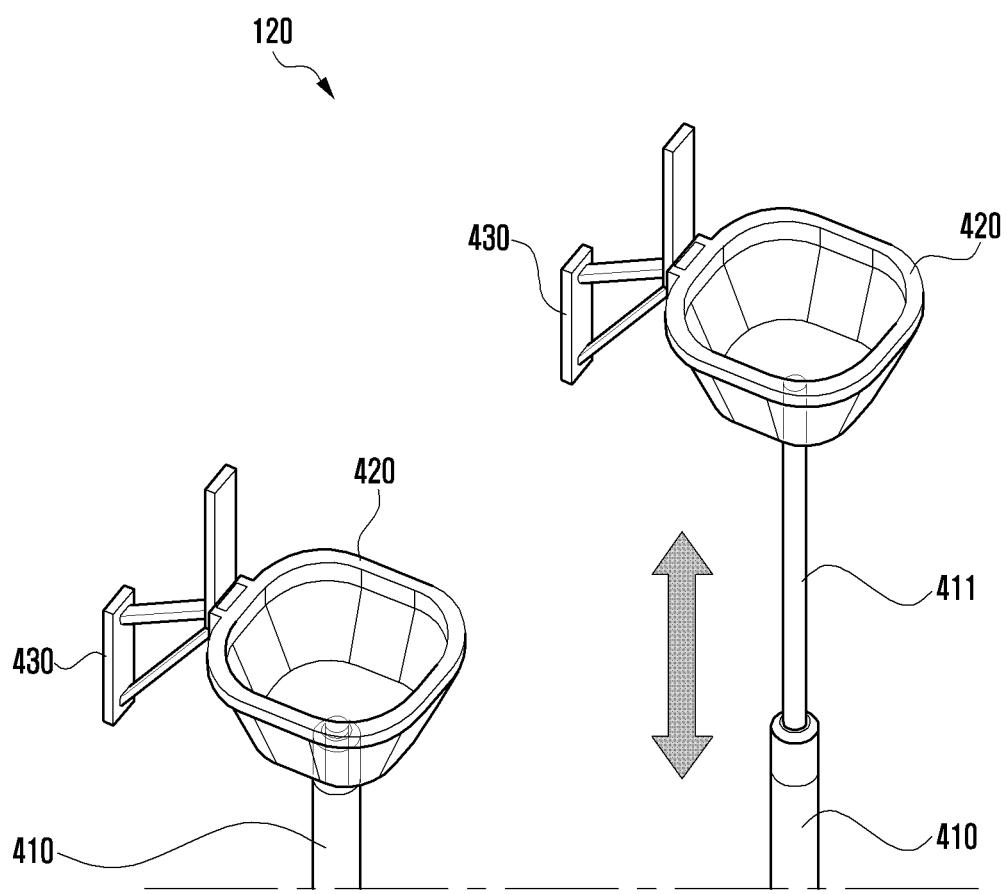
FIG. 5 is a perspective view illustrating a support equipment according to certain embodiments as viewed from above.

FIG. 3 is an exemplary view specifically illustrating the in-house relay device 110 shown in FIG. 1. FIG. 4 is a cross-sectional view illustrating the support equipment 120 according to certain embodiments as viewed from side. FIG. 5 is a perspective view illustrating the support equipment 120 according to certain embodiments as viewed from above.

Referring to FIG. 3, the in-house relay device 110 according to certain embodiments may include a vertical rod 410, a support member 420, or a fixing member 430.

According to an embodiment, the vertical rod 410 may be installed from a bottom surface 11 in a z-axis direction. As shown, the vertical rod 410 may include a pedestal 320 placed on the bottom surface 11, and may have a pole shape extending from the pedestal 320 in the z-axis direction. According to an embodiment, a through-hole 4101 through which a power line 311 and a communication line 312 connected to the in-house relay device 110 are installed may be provided inside the vertical rod 410. According to an embodiment, the power line 311 may be a component for supplying power to the in-house relay device 110. According to an embodiment, the communication line 312 may be a component for wired communication (e.g., local area network (LAN)).

According to an embodiment, the support member 420 may be disposed at one end of the vertical rod 410 to be coupled to the vertical rod 410 and may support the in-house relay device 110. According to one embodiment, the support member 420 may be disposed to face the permeable outer wall 12, whereby the in-house relay device 110 may perform smooth wireless communication in an ultra-high frequency (mmWave) band through the permeable outer wall 12. According to an embodiment, the support member 420 may include a rotating plate for adjusting a direction of the in-house relay device 110. The configuration of the rotating plate will be described in detail later in conjunction with FIG. 6 or FIG. 9.

Referring to FIG. 4, the fixing member 430 according to an embodiment may be a component that is coupled to a portion of the support member 420 and fixes the support member 420 in a direction of the permeable outer wall 12. For example, the fixing member 430 may fix the support member 420 to the permeable outer wall 12 or the support member 420 to the wall surface 13.

According to certain embodiments, the fixing member 430 may include at least one bracket connected to a portion of the support member 420, and an attachment member for fixing the bracket to the permeable outer wall 12 or the wall surface 13. According to certain embodiments, the attachment member may include any one of a double-sided tape, a clamp, and an air absorber.

According to certain embodiments, the fixing member 430 may be fixably fixed to the wall surface 13 instead of the permeable outer wall 12. According to an embodiment, when the fixing member 430 is fixed to the wall surface 13 instead of the permeable outer wall 12, the length of at least a portion of the vertical rod 410 may extend so that the in-house relay device 110 faces the permeable outer wall 12. For example, an area to which the fixing member 430 is attached is not limited as long as the in-house relay device 110 faces the permeable outer wall 12.

Referring to FIG. 5, the support device 120 according to an embodiment may adjust the height in the z-axis direction. For example, the vertical rod 410 according to an embodiment may include an extension member for extending the length of the vertical rod 410 in the z-axis direction. According to certain embodiments, the vertical rod 410 may have a form in which at least two stages of a retractable rod 411 having a variable height are connected to each other.

Figure 6:
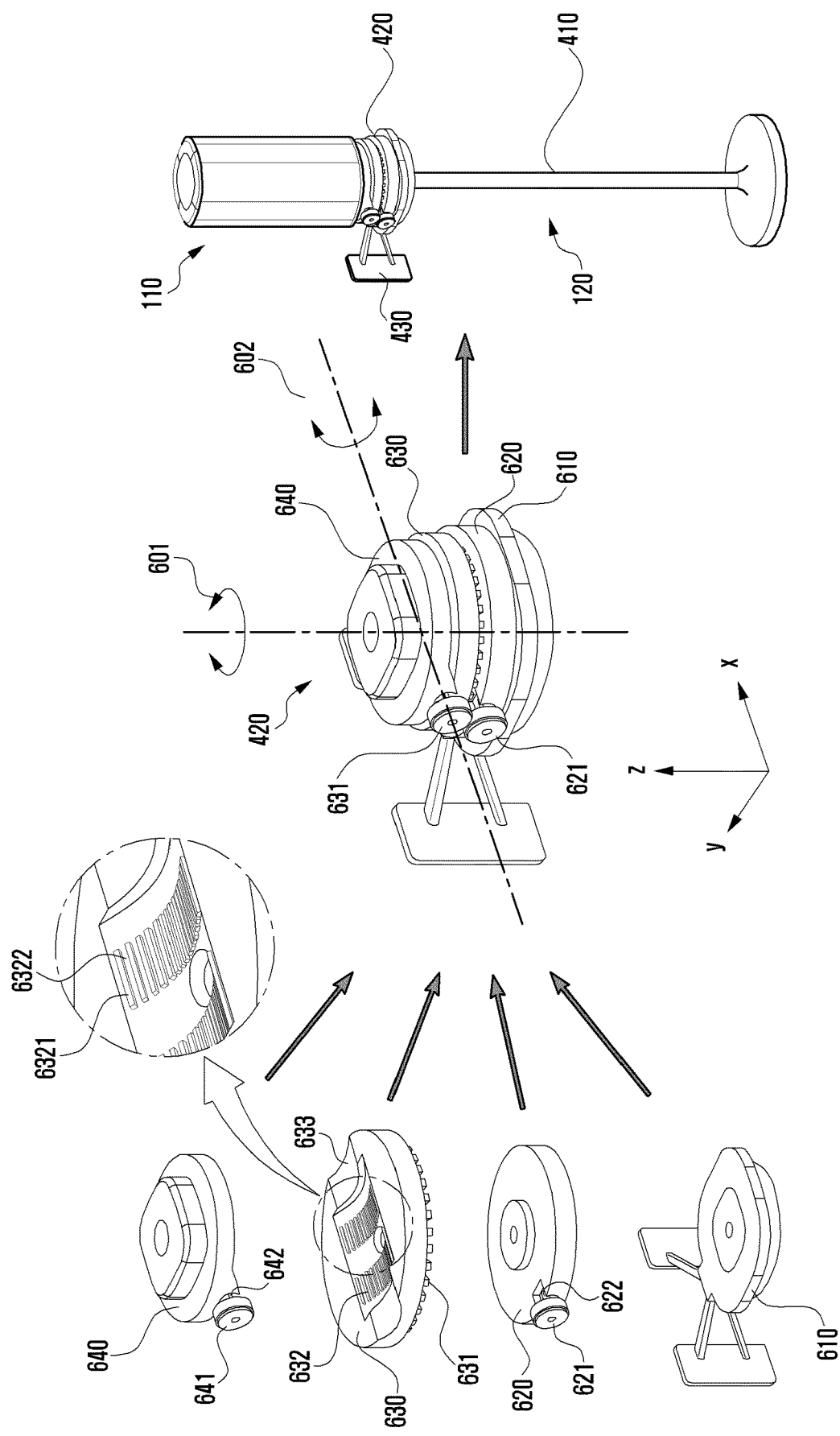
FIG. 6 is an exploded and assembled perspective view illustrating a support member according to certain embodiments.

FIG. 6 is an exploded and assembled perspective view illustrating a support member according to certain embodiments.

Referring to FIG. 6, the support member 420 may have a form in which at least one fixing plate and at least one rotating plate 630 are stacked. More specifically, the support member 420 may include a base plate 610, a first fixing plate 620, a rotating plate 630, or a second fixing plate 640.

As shown the base plate 610 may be disposed at the bottom of the support member 420 to be coupled to the vertical rod 410.

According to an embodiment, the first fixing plate 620 may be loaded on the base plate 610. A first knob 621 for rotating 601 of the rotating plate 630 about the z-axis direction may be provided on a side surface of the first fixing plate 620. According to an embodiment, the first knob 621 may include a first gear 622, and the first gear 622 may be coupled to a first toothed rail 631 provided on the bottom surface 11 of the rotating plate 630 in a male and female coupling manner. According to an embodiment, when the first knob 621 is rotated clockwise by a user operation, the rotating plate 630 may be configured to be rotated clockwise about the z-axis direction. Similarly, when the first knob 621 is rotated counterclockwise by a user operation, the rotating plate 630 may be configured to be rotated counterclockwise around the z-axis direction. According to certain embodiments, a corresponding relationship between the rotation direction of the first knob 621 and the rotation direction of the rotating plate 630 may be opposite to the above example.

According to an embodiment, the rotating plate 630 may be loaded on the first fixing plate 620 and may be configured to be rotated about the z-axis direction based on the rotation direction of the first knob 621. The rotating plate 630 may be rotated bout a direction 602 perpendicular to the z-axis direction, for example, the x-axis direction based on the rotation direction of a second knob 641 provided on the second fixing plate 640.

According to an embodiment, the second fixing plate 640 may be loaded on the rotating plate 630 and coupled to a bottom surface (e.g., 1101 of FIG. 7) of the in-house relay device 110.

According to an embodiment, the second knob 641 for rotating the rotating plate 630 may be provided on a side surface of the second fixing plate 640. According to an embodiment, the second knob 641 may include a second gear 642, and the second gear 642 may be coupled to a second toothed rail 632 provided on an upper surface of the rotating plate 630 in a male and female coupling manner.

According to certain embodiments, a groove 633 on which the second toothed rail 632 is provided may be provided on the upper surface of the rotating plate 630, and the groove 633 may be a groove that has a semi-circular column shape and is arranged in the x-axis direction. According to an embodiment, the second toothed rail 632 may be provided on the surface of the groove 633, and may include a plurality of peaks 6321 and a plurality of valleys 6322.

According to an embodiment, the plurality of peaks 6321 and the plurality of valleys 6322 may be provided in the x-axis direction. Accordingly, when the second knob 641 is rotated, the rotating plate 630 may be rotated about the x-axis according to a curvature of the groove 633.

According to an embodiment, the support member 420 is configured as described above, so that the user can manipulate the first knob 621 to adjust a yaw direction (e.g., a rotation direction about the z-axis direction) of the in-house relay device 110, or the user can manipulate the second knob 641 to adjust a pitch direction (e.g., a rotation direction about the x-axis direction) of the in-house relay device 110.

Figure 7:
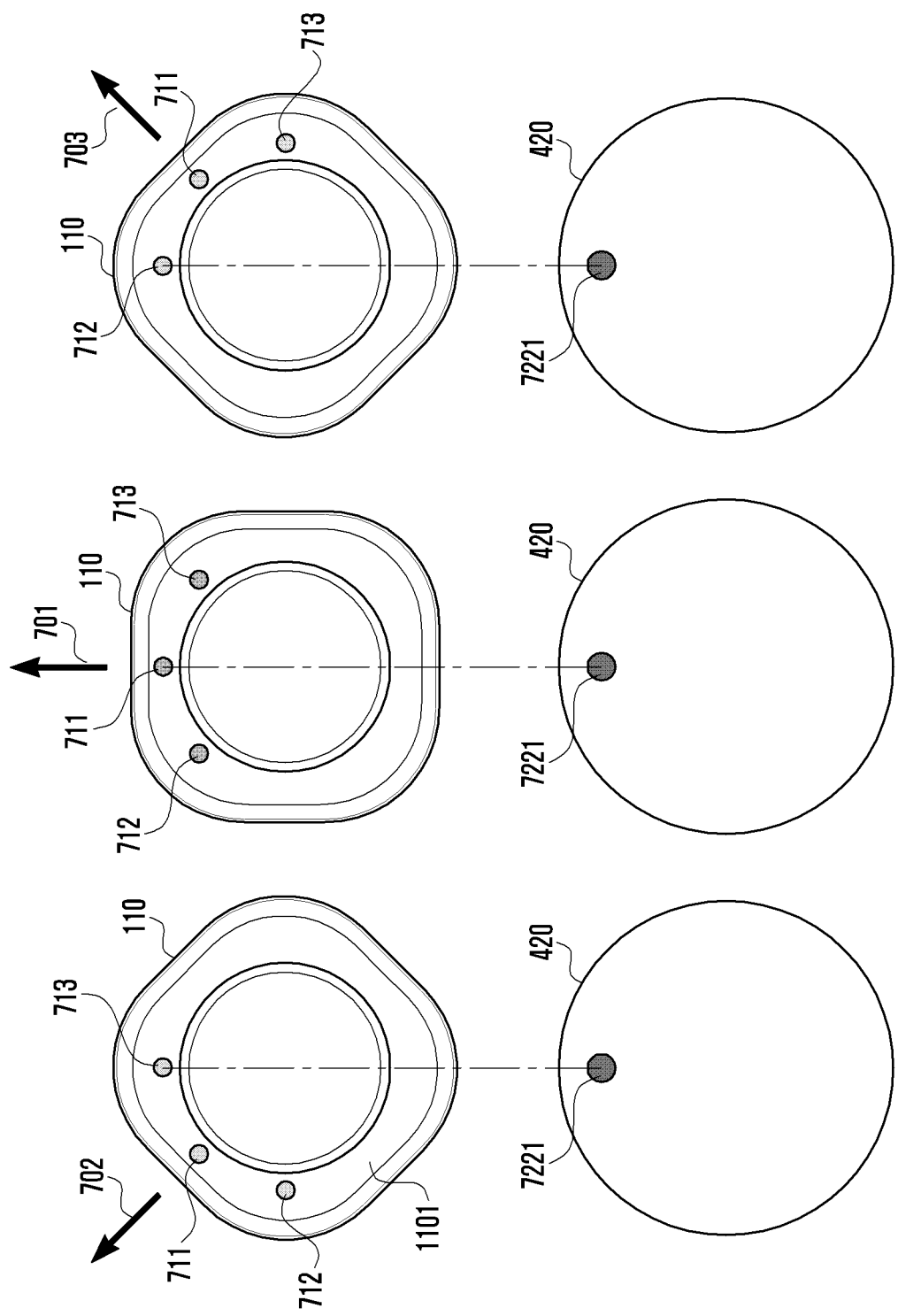
FIG. 7 is a plan view illustrating a bottom surface of an in-house relay device and an upper surface of a support member according to certain embodiments.
Figure 8A:
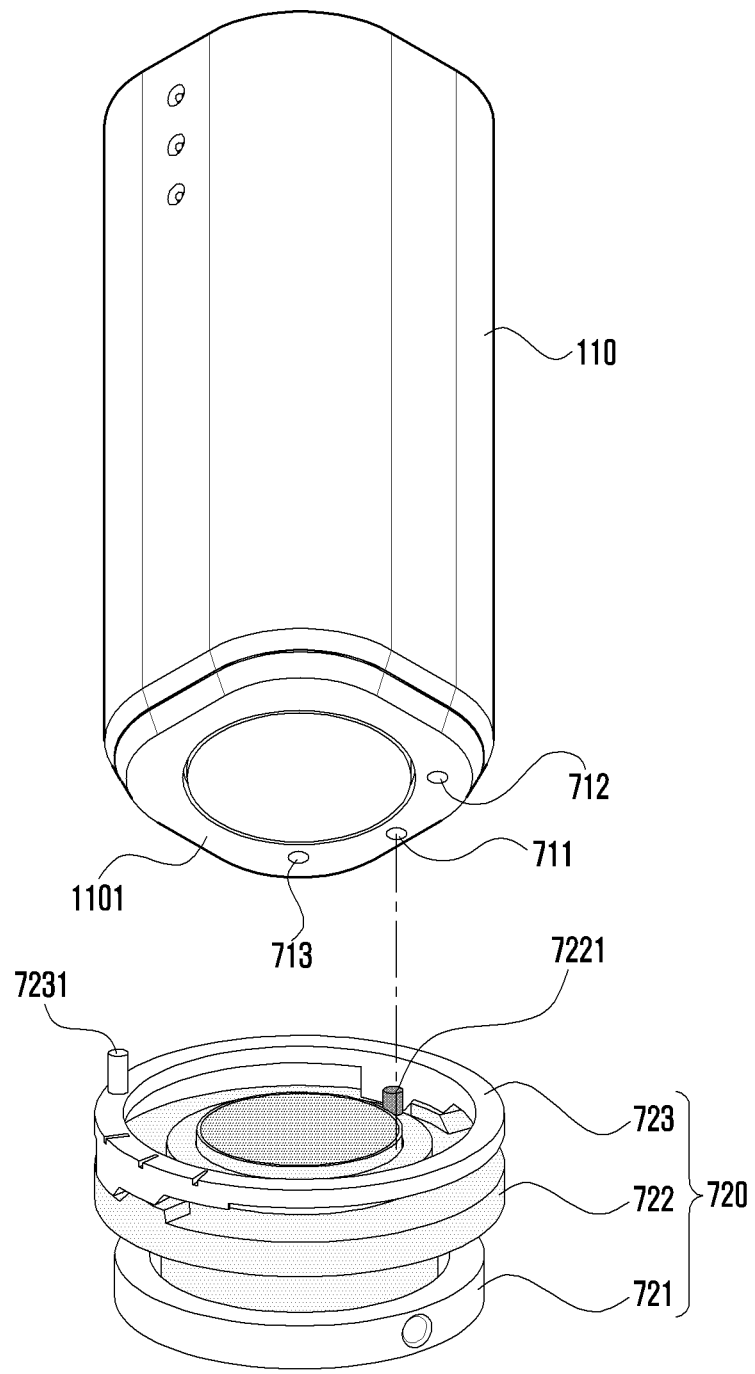
FIG. 8A is a view illustrating a method of adjusting the direction of an in-house relay device by coupling a bottom surface of the in-house relay device and an upper surface of a support member.
Figure 8B:
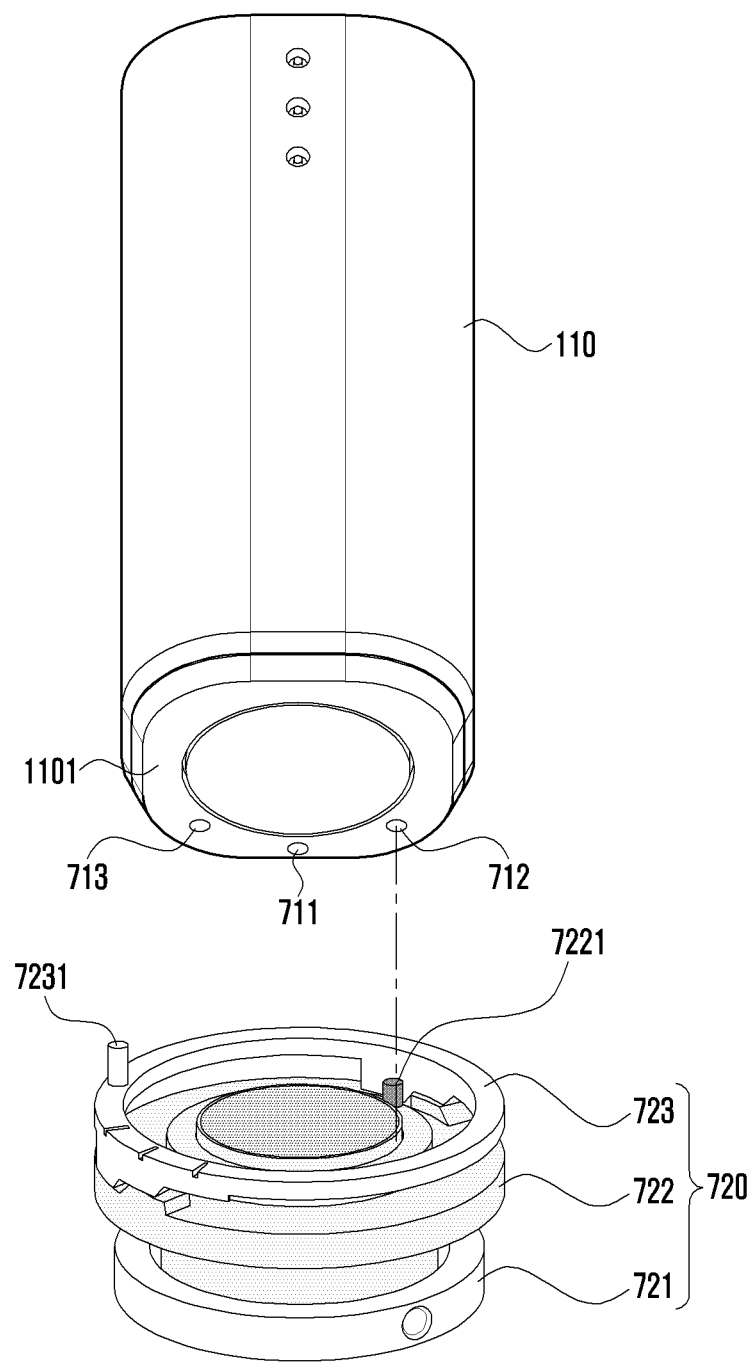
FIG. 8B is a view illustrating a method of adjusting the direction of an in-house device by coupling a bottom surface of the in-house relay device and an upper surface of a support member.
Figure 8C:
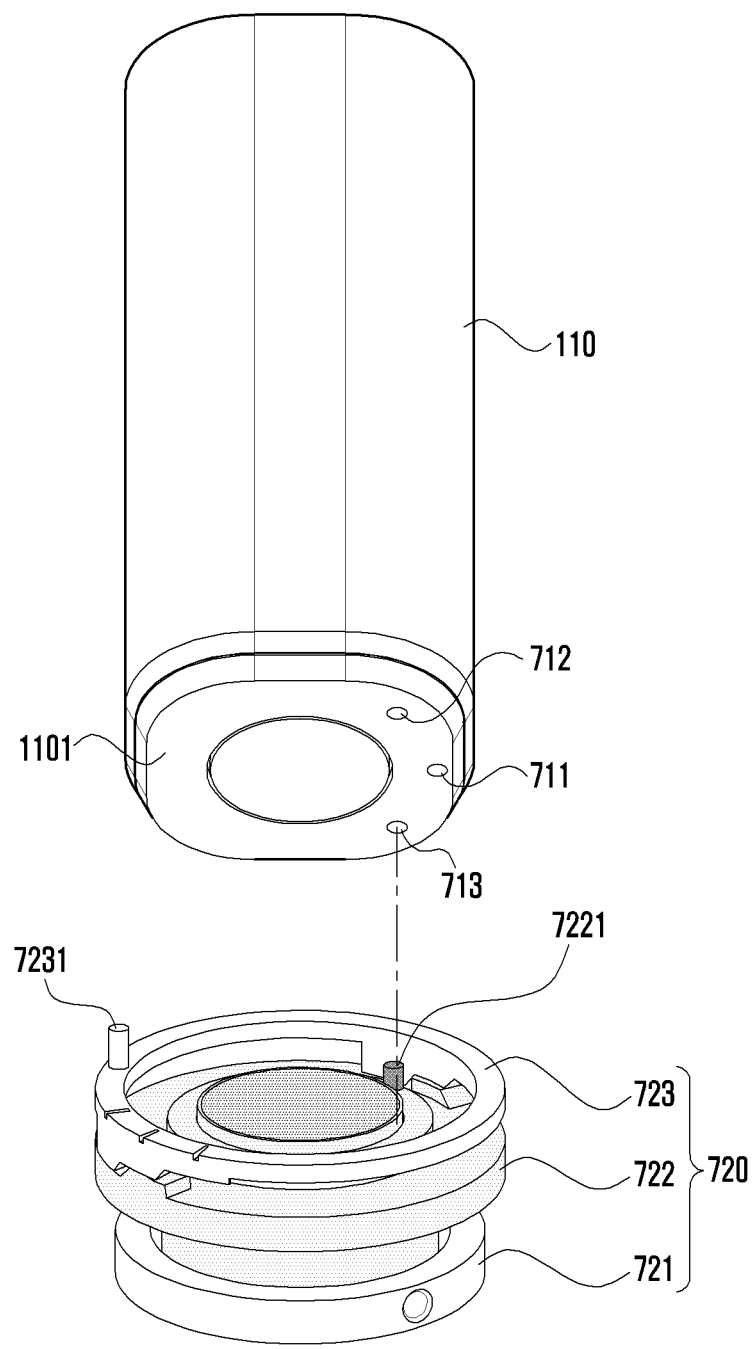
FIG. 8C is a view illustrating a method of adjusting the direction of an in-house relay device by coupling a bottom surface of the in-house relay device and an upper surface of a support member.

FIG. 7 is a plan view illustrating the bottom surface 1101 of the in-house relay device 110 and an upper surface of the support member 420 according to certain embodiments. FIGS. 8A to 8C are views illustrating a method of adjusting the direction of the in-house relay device 110 by coupling the bottom surface 1101 of the in-house relay device 110 and an upper surface of the support member 420.

Referring to FIG. 7, the support member 420 according to certain embodiments may be variously changed or modified in addition to its shape shown in FIG. 6. For example, as shown in FIG. 7, in the support member 420 according to certain embodiments, a protrusion 7221 may be provided on an upper surface of the support member 420 facing the bottom surface 1101 of the in-house relay device 110. According to an embodiment, a plurality of insertion grooves 711, 712, and 713 into which the protrusion 7221 can be inserted may be provided on the bottom surface 1101 of the in-house relay device 110, and the plurality of insertion grooves 711, 712, and 713 may be arranged along the circumference of the bottom surface 1101 of the in-house relay device 110 at designated spacings to adjust the yaw direction (e.g., the rotation direction about the z-axis direction) of the in-house relay device 110. According to an embodiment, the user may adjust the direction of the in-house relay device 110 by combining any one of the plurality of insertion grooves 711, 712, and 713 provided on the bottom surface 1101 of the in-house relay device 110 and the protrusion 7221 of the support member 420.

For example, as shown, the in-house relay device 110 according to an embodiment may include a first insertion groove 711, a second insertion groove 712 disposed in one direction (e.g., in the left direction of the first insertion groove 711 in FIG. 7) of the first insertion groove 711, or a third insertion groove 713 disposed in the other direction (e.g., in the right direction of the first insertion groove 711 in FIG. 7) of the first insertion groove 711.

According to an embodiment, as shown in FIG. 8A, when the user combines the first insertion groove 711 provided on the bottom surface 1101 of the in-house relay device 110 and the protrusion 7221 of the support member 720, the in-house relay device 110 may be disposed to face a front surface (e.g., 701 of FIG. 7) on which the permeable outer wall 12 is disposed.

According to an embodiment, as shown in FIG. 8B, when the user combines the second insertion groove 712 provided on the bottom surface 1101 of the in-house relay device 110 and the protrusion 7221 of the support member 720, the in-house relay device 110 may be disposed to face a front surface at a +45 degree-angle (e.g., 703 in FIG. 7) in which the permeable outer wall 12 is disposed. According to certain embodiments, the front surface at the +45 degree-angle is only for illustrative purpose, thus the disclosure is not limited thereto and the front surface at the +45 degree-angle may be adjusted to various angles.

According to an embodiment, as shown in FIG. 8C, when the user combines the third insertion groove 713 provided on the bottom surface 1101 of the in-house relay device 110 and the protrusion 7221 of the support member 720, the in-house relay device 110 may be disposed to face a front surface at a −45 degree-angle (e.g., 702 of FIG. 7) in which the permeable outer wall 12 is disposed. According to certain embodiments, the front surface at the −45 degree-angle is only for illustrative purpose, thus the disclosure is not limited thereto and the front surface at the −45 degree-angle may be adjusted to various angles.

Figure 9:
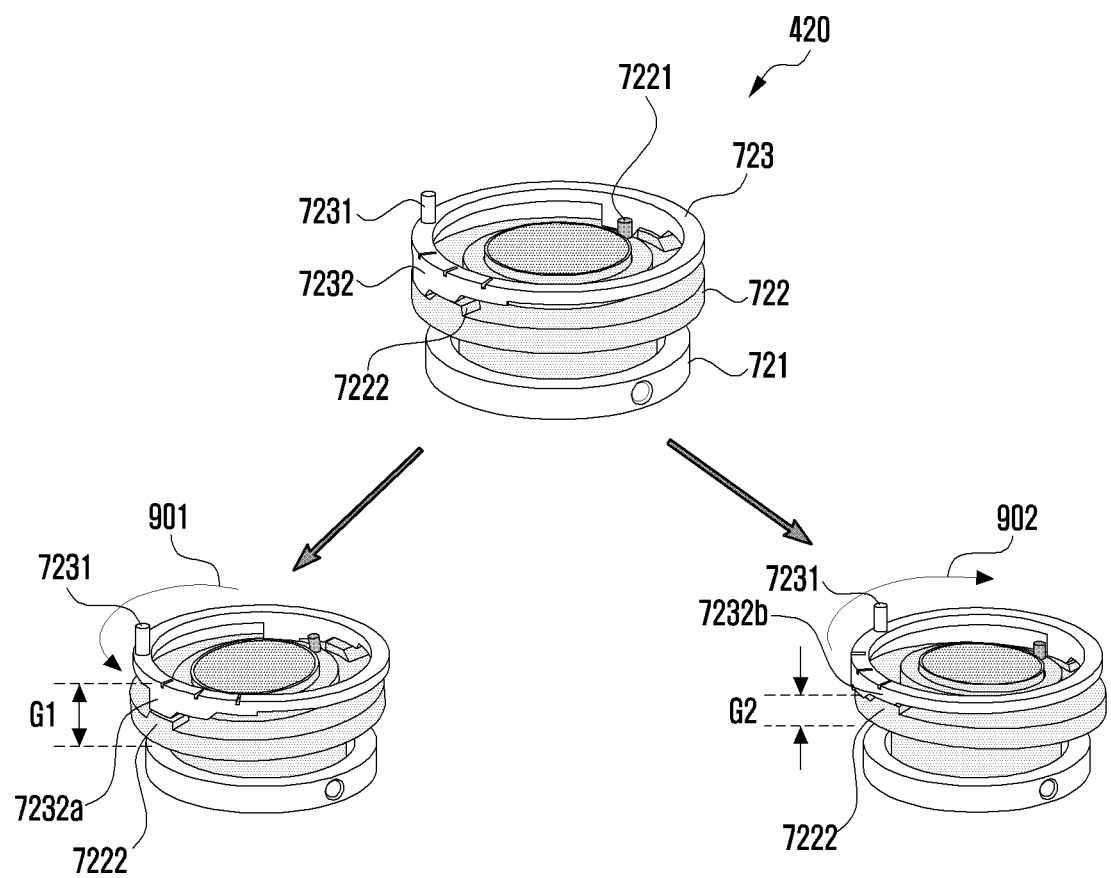
FIG. 9 is a perspective view illustrating a support member according to another embodiment.

FIG. 9 is a perspective view illustrating the support member 420 according to another embodiment. As shown, FIG. 9 may be a perspective view specifically illustrating the support member 720 illustrated in FIGS. 8A to 8C.

Referring to FIG. 9, the support member 420 according to another embodiment may have a form in which at least one fixing plate and at least one tilting plate are stacked. According to certain embodiments, the support member 420 may include a base plate 721, a tilting plate 722, or a rotating plate 723.

According to an embodiment, the base plate 721 may be disposed at the bottom of the support member 420 to be coupled to the vertical rod 410.

According to an embodiment, the tilting plate 722 may be loaded on the base plate 721. The tilting plate 722 may include the protrusion 7221 described with reference to FIGS. 7 to 8. According to an embodiment, a protrusion 7222 in the form of a step may be provided on an upper surface of the tilting plate 722, and the protrusion 7222 may be configured to contact any one of a plurality of steps 7232 provided on the bottom surface of the rotating plate 723.

According to an embodiment, the plurality of steps 7232 provided on the bottom surface of the rotating plate 723 may have different heights, and the tilting plate 722 may have a variable inclination according to the height of the step 7232 in contact with the protrusion 7222.

According to an embodiment, a first step 7232*a* having a relatively high height may be provided on the bottom surface of the rotating plate 723, and when the first step 7232*a* and the protrusion 7222 are brought into contact with each other by the user manipulating the rotating plate 723, a relatively large first gap G1 may be provided between the rotating plate 723 and the tilting plate 722 at the contacting portion. The tilting plate 722 according to an embodiment may be inclined at a first designated angle according to the first gap G1.

According to an embodiment, a second step 7232b having a relatively low height may be provided on the bottom surface of the rotating plate 723, and when the second step 7232b and the protrusion 7222 are brought into contact with each other by the user manipulating the rotating plate 723, a relatively small second gap G2 may be provided between the rotating plate 723 and the tilting plate 722 at the contacting portion. The tilting plate 722 according to an embodiment may be inclined at a second designated angle smaller than the first designated angle according to the second gap G2.

According to an embodiment, the rotating plate 723 may be loaded on the tilting plate 722 and may be provided in a ring shape to surround a portion of the lower side surface of the in-house relay device 110. According to an embodiment, a handler 7231 may protrude from the upper surface of the rotating plate 723 so that the user can manipulate the rotating plate 723. For example, the user may rotate the rotating plate 723 in a counterclockwise direction 901 or a clockwise direction 902 using the handler 7231, and the inclination of the tilting plate 722 may be variable according to the rotation.

Figure 10:
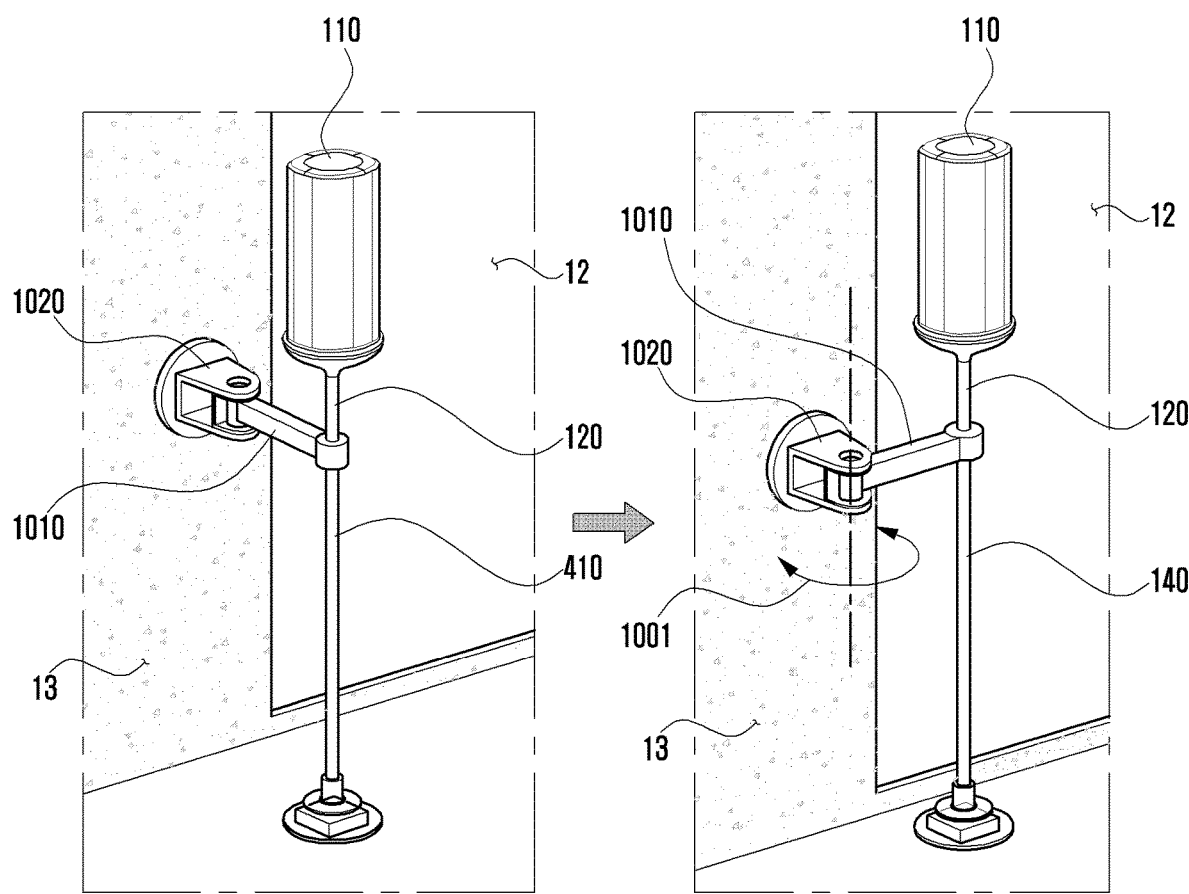
FIG. 10 is a view illustrating a rotating arm of a support device according to certain embodiments.

FIG. 10 is a view illustrating a rotating arm of the support device 120 according to certain embodiments.

Referring to FIG. 10, the support equipment 120 according to certain embodiments may further include a wall fixing unit 1020 and a rotating arm 1010. According to certain embodiments, the wall fixing unit 1020 may be a component that is fixed or attached to the wall surface 13 in a house (e.g., 10 of FIG. 1), and may be any one of a double-sided tape, a clamp, or an air absorber. According to an embodiment, the rotating arm 1010 may be a component for coupling the wall fixing unit 1020 and the support member 420 through the vertical rod 410. According to an embodiment, the rotating arm 1010 may connect between the wall fixing unit 1020 and the vertical rod 410 of the support equipment 120. According to an embodiment, the rotating arm 1010 may connect between the wall fixing unit 1020 and a portion of the support member 420 (e.g., a bottom surface or a side surface of the support member 420). The support equipment 120 according to certain embodiments further includes the wall fixing unit 1020 and the rotating arm 1010 whereby the location of the in-house relay device 110 can be adjusted within a designated radius 1001 with respect to the wall fixing unit 1020.

Figure 11:
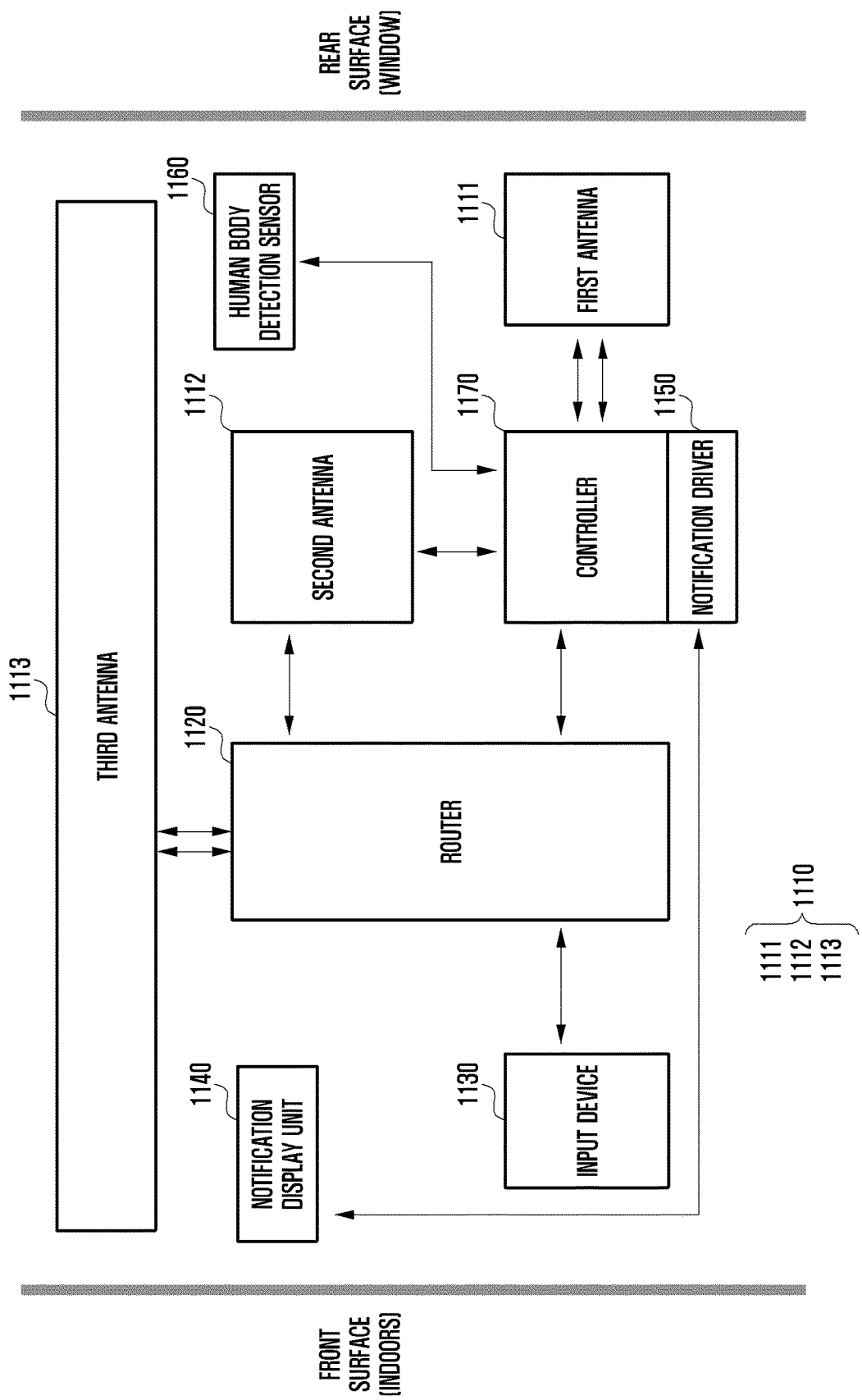
FIG. 11 is a block diagram illustrating the configuration of an in-house relay device according to certain embodiments.

FIG. 11 is a block diagram illustrating the configuration of the in-house relay device 110 according to certain embodiments.

Referring to FIG. 11, the in-house relay device 110 according to certain embodiments may include a plurality of antennas 1110, a router 1120, an input device 1130, a notification display unit 1140, a notification driver 1150, a proximity sensor 1160, or a controller 1170.

According to an embodiment, the plurality of antennas 1110 may include at least one first antenna 1111 that performs wireless communication at a first designated frequency, at least one second antenna 1112 that performs wireless communication at a second designated frequency, or at least one third antenna 1113 that performs wireless communication at a third designated frequency.

According to an embodiment, the first designated frequency may be a communication frequency of a Sub6 (6 GHz or less) band for 5G communication. The first designated frequency may further include a communication frequency for a second generation (2G), 3G, 4G, or long-term evolution (LTE) network.

According to an embodiment, the second designated frequency may be a communication frequency of an ultra-high frequency (e.g., mmWave {e.g., 28 GHz or 39 GHz}) band for 5G communication.

According to an embodiment, the third designated frequency may be a communication frequency for Bluetooth or Wi-Fi communication in 2.4 GHz or 5 GHz ISM band.

According to an embodiment, the router 1120 may be a device that connects wireless communication performed with a repeater (e.g., 200 of FIG. 2) of a wireless communication service provider through the first antenna 1111 or the second antenna 1112 and wireless communication performed with information home appliances in indoors 10 through the third antenna 1113. According to an embodiment, the router 1120 may be a device that connects the wireless communication performed with the repeater 200 of the wireless communication service provider and the information home appliances in the home 10 through the first antenna 1111 or the second antenna 1112.

According to an embodiment, the input device 1130 may include at least one physical button exposed through at least a portion of a housing of the in-house relay device 110, or a touch input button. For example, the input device 1130 may include a power button, a reset button, a Wi-Fi protected setup (WPS) button, or a USB interface terminal.

According to an embodiment, the notification display unit 1140 may serve as an indicator for displaying status information of the in-house relay device 110. According to an embodiment, the status information of the in-house relay device 110 may include signal strength of wireless communication performed with the repeater 200 of the wireless communication service provider. According to an embodiment, the notification display unit 1140 may be at least one LED. According to certain embodiments, the notification display unit 1140 may include a display (not shown).

According to an embodiment, the notification driver 1150 may be a component for driving the notification display unit 1140. For example, the notification driver 1150 may be an LED driver for driving an LED or a display driver IC (DDI) for driving the display.

According to an embodiment, the proximity sensor 1160 may be a passive infra-red (PIR) sensor. However, it should be noted that other sensory type devices known to artisians may be also utilized. The proximity sensor 1160 may detect whether a human body approaches in a designated direction of the in-house relay device 110, for example, in a direction of the permeable outer wall 12, and may transmit the detected information (e.g., data) to the controller 1170.

According to an embodiment, the controller 1170 may control the overall operation of the in-house relay device 110 and may include a communication module electrically connected to the plurality of antennas 1110. In operation, the controller 1170 may support to establish a channel of wireless communication performed with the repeater 200 of the wireless communication service provider and to perform communication through the established communication channel. According to an embodiment, the controller 1170 may support to establish a channel of wireless communication (e.g., Bluetooth or Wi-Fi communication) performed with the information home appliances in indoors 10, and to perform communication through the established communication channel. According to an embodiment, the controller 1170 may control wired communication (e.g., local area network (LAN) communication) performed with the information home appliances in the home 10.

According to an embodiment, when a human body is detected from a designated direction (e.g., a direction of the permeable outer wall 12) through the proximity sensor 1160, the controller 1170 may reduce the transmission power of at least one of the first to third antennas 1111, 1112, and 1113 to a designated value or less. According to certain embodiments, in the in-house relay device 110, for smooth communication with the repeater 200 of the wireless communication service provider, communication in an ultra-high frequency (e.g., mmWave {e.g., 28 GHz or 39 GHz}) band for 5G communication may use a high power of 40 dBm or more. According to certain embodiments, the in-house relay device 110 may detect the proximity of a human body using the proximity sensor 1160, and may reduce the transmission power of the antenna in response to the detection of the human body, thereby preventing harm to the human body due to electromagnetic waves.

Figure 12:
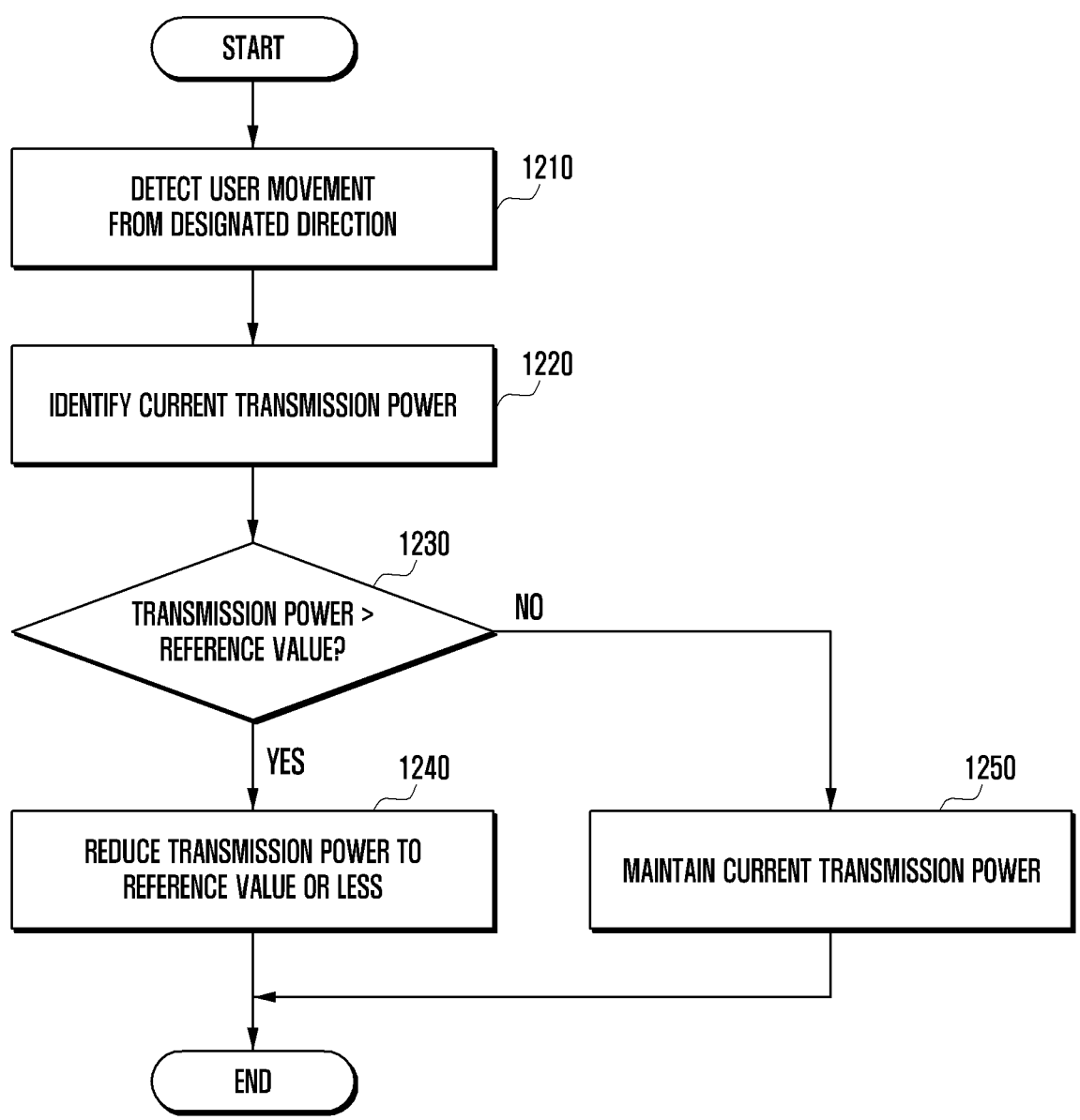
FIG. 12 is a flowchart illustrating an operation of an in-house relay device according to certain embodiments.

FIG. 12 is a flowchart illustrating an operation of the in-house relay device 110 according to certain embodiments.

In operation 1210, the in-house relay device 110 according to certain embodiments may detect a user's movement from a designated direction using the proximity sensor 1160. According to an embodiment, the in-house relay device 110 may use the proximity sensor 1160 to determine whether a human body is detected in a direction in which some antennas (e.g., the second antenna 1112) of the in-house relay device 110 performs a beamforming operation of 5G communication.

In operations 1220 and 1230, the in-house relay device 110 according to certain embodiments may identify the transmission power of the current antenna when the user's movement is detected in the designated direction. For example, the in-house relay device 110 according to an embodiment may determine whether the transmit power exceeds a reference value, for example, 36 dBm.

In operation 1240, when the transmission power exceeds the reference value (e.g., the result of operation 1230 is "YES"), the in-house relay device 110 according to certain embodiments may reduce the transmission power to a reference value or less. For example, the in-house relay device 110 may reduce the transmit power to the reference value or less, for example, 36 dBm.

In operation 1250, when the transmission power does not exceed the reference value (e.g., the result of operation 1230 is "NO"), the in-house relay device 110 according to certain embodiments may maintain the current transmission power.

Figure 13:
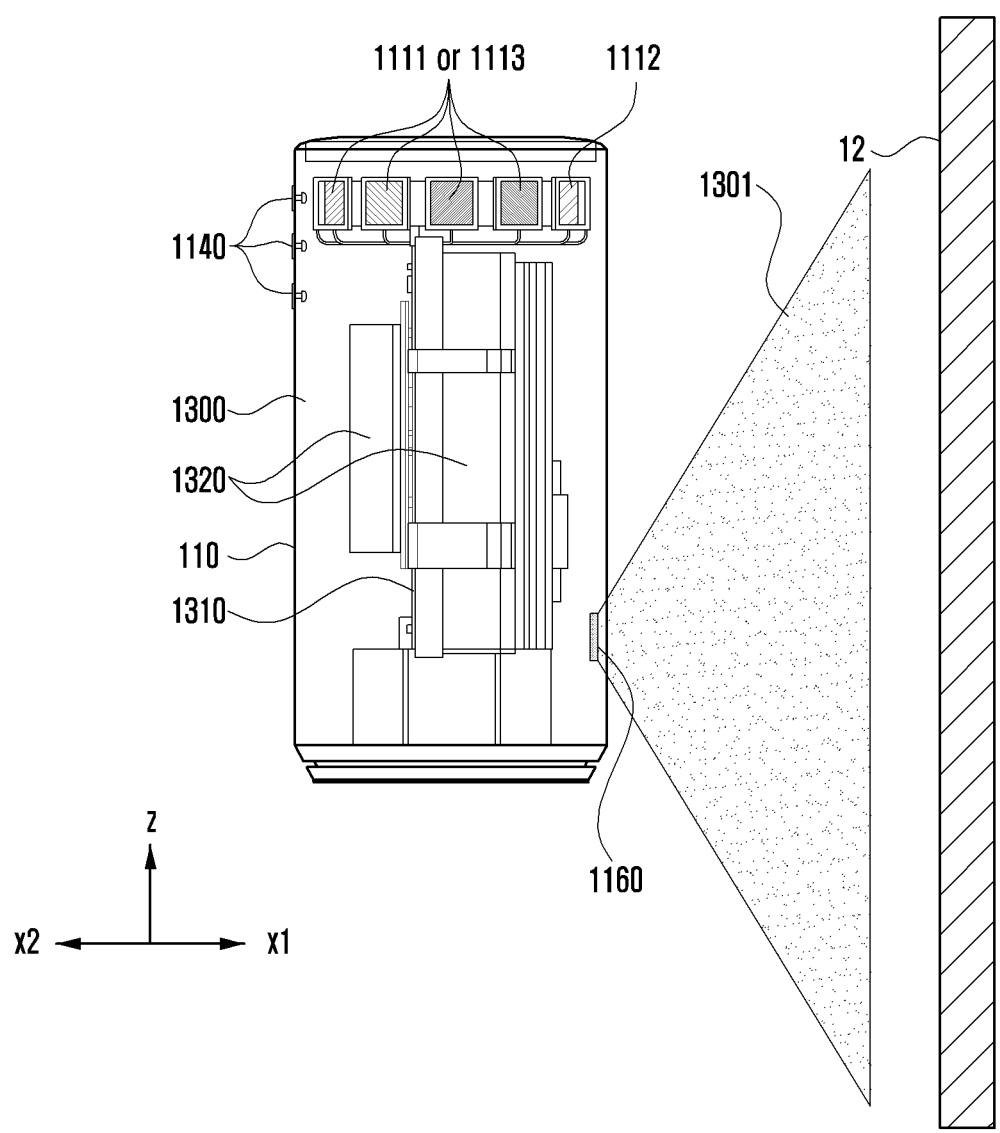
FIG. 13 is a cross-sectional view illustrating an in-house relay device according to certain embodiments.

FIG. 13 is a cross-sectional view illustrating an in-house relay device according to certain embodiments.

Referring to FIG. 13, a signal of an ultra-high frequency (e.g., mmWave {e.g., 28 GHz or 39 GHz}) band for 5G communication according to certain embodiments has a relatively strong linearity characteristic. Accordingly, the second antenna 1112 through which the signal of the ultra-high frequency (e.g., mmWave {e.g., 28 GHz or 39 GHz}) band is transmitted and received may be disposed to face the permeable outer wall 12 unlike the remaining antennas (e.g., the first antenna 1111 or the third antenna 1113), and the proximity sensor 1160 may be also disposed in the same direction as the second antenna 1112 through which the signal of the ultra-high frequency (e.g., mmWave {e.g., 28 GHz or 39 GHz}) band is transmitted and received, in consideration of the linearity characteristic of the band. According to certain embodiments, since a beamforming operation angle of 5G communication is about 90 degrees, a sensing angle 1301 of the proximity sensor 1160 may be designed to be 90 degrees or more and 110 degrees or less.

According to certain embodiments, the opposite direction of the second antenna 1112 through which the signal of the ultra-high frequency (e.g., mmWave {e.g., 28 GHz or 39 GHz}) band is transmitted and received in the in-house relay device 110 may be oriented indoors, and the notification display unit 1140 (e.g., an LED) may be disposed so that the user can easily check. In FIG. 13, reference numeral 1300 denotes the housing of the in-house relay device 110, reference numeral 1310 denotes a PCB on which the controller 1170 is mounted, and reference numeral 1320 denotes a heat dissipation member (e.g., a heat sink).

Figure 14:
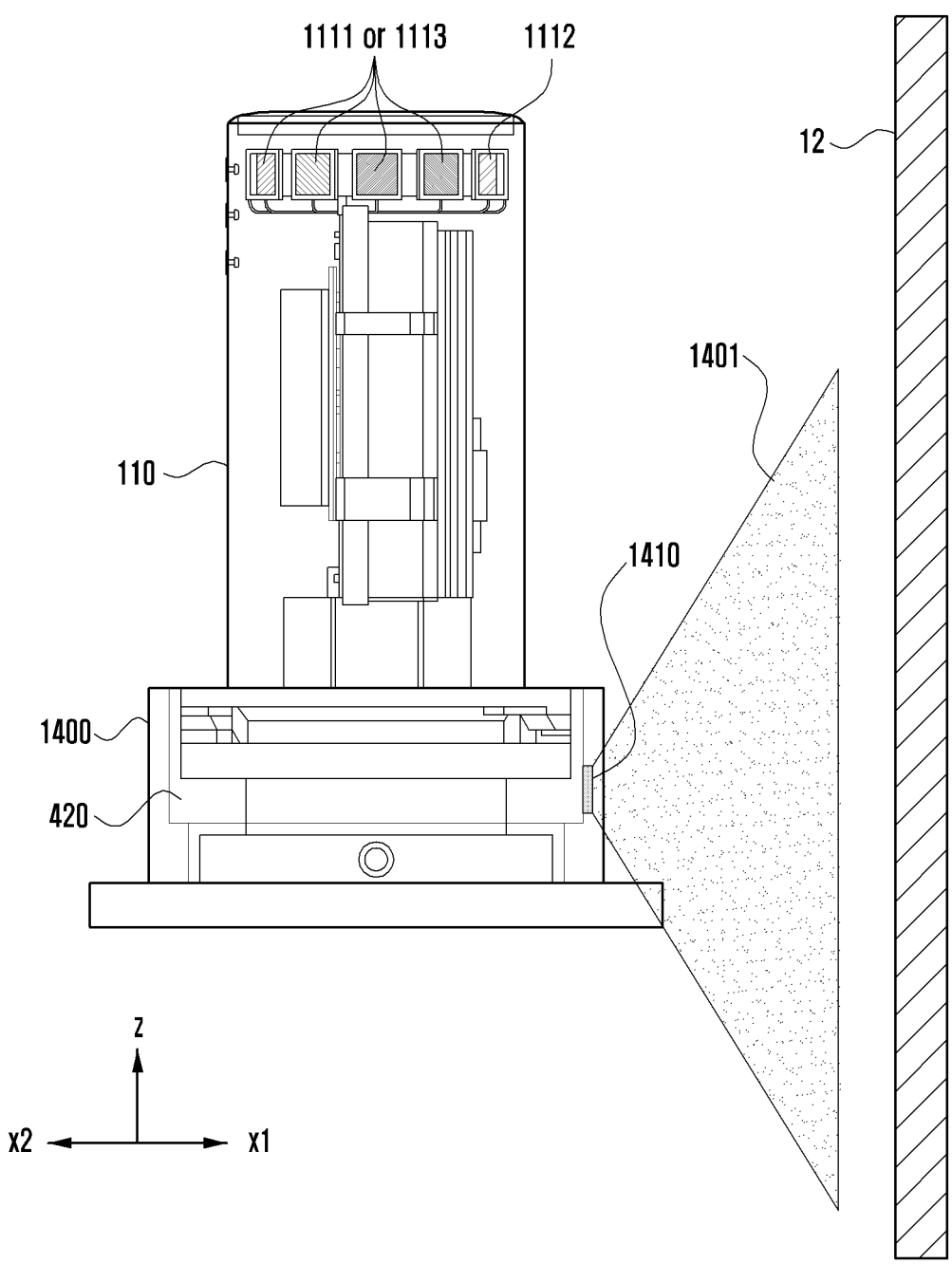
FIG. 14 is a cross-sectional view illustrating a case in which a proximity sensor is installed in a support equipment according to another embodiment.

FIG. 14 is a cross-sectional view illustrating a case in which the proximity sensor 1410 is installed in the support equipment 120 according to another embodiment.

According to certain embodiments, the proximity sensor 1410 may be installed on the support equipment 120. For example, as shown in FIG. 14, the support member 420 may include the proximity sensor 1410, and the proximity sensor 1410 may be disposed in the same direction (e.g., the direction of the permeable outer wall 12) as the second antenna 1112 through which the signal of the ultra-high frequency (e.g., mmWave {e.g., 28 GHz or 39 GHz}) band is transmitted and received inside a case 1400 surrounding the support member 420. According to an embodiment, a sensing angle 1401 of the proximity sensor 1410 embedded in the support member 420 may be designed to be 90 degrees or more and 110 degrees or less.

According to certain embodiments, when the proximity sensor 1410 is installed in the support equipment 120, the support equipment 120 may include a connection member (not shown) for transmitting a signal detected from the proximity sensor 1410 to the in-house relay device 110. For example, the support member according to an embodiment may further include a connection member electrically connecting the proximity sensor 1410 and the in-house relay device 110. According to an embodiment, the connection member may include at least one terminal (e.g., a pad or a pin) (not shown) provided on the upper surface of the support member 420 facing the bottom surface of the in-house relay device 110, and the signal detected from the proximity sensor 1410 may be transmitted to the in-house relay device 110 through the at least one terminal.

Figure 15:
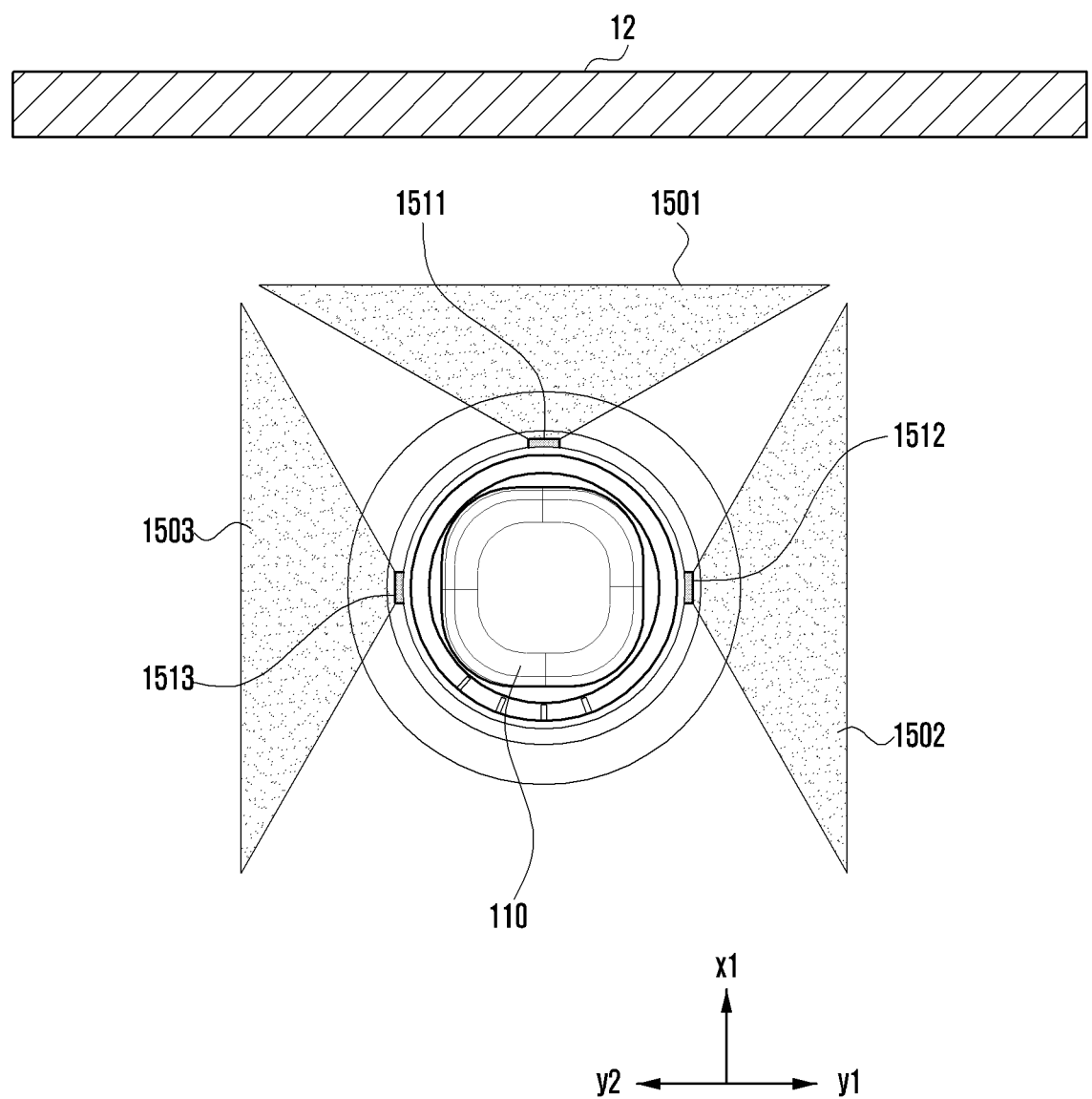
FIG. 15 is a view illustrating a direction in which a proximity sensor is installed.

FIG. 15 is a view illustrating a direction in which a proximity sensor 1511, 1512, or 1513 is installed.

Referring to FIG. 15, proximity sensors 1511, 1512, and 1513 according to certain embodiments may be disposed not only in the same direction as a second antenna (e.g., 1112 of FIG. 13) in which a signal of the ultra-high frequency (e.g., mmWave {e.g., 28 GHz or 39 GHz}) band is transmitted and received, but also in the left and right directions of the in-house relay device 110. The proximity sensors 1511, 1512, and 1513 according to certain embodiments may include the first proximity sensor 1511 that is disposed in a direction facing the permeable outer wall 12 to detect a human body in a first designated angular range 1501, the second proximity sensor 1512 that is disposed in a right 90 degree direction facing the permeable outer wall 12 to detect a human body in a second designated angular range 1502, or the third proximity sensor 1513 that is disposed in a left 90 degree direction facing the permeable outer wall 12 to detect a human body in a third designated angular range 1503. According to certain embodiments, the first to third proximity sensors 1511, 1512, and 1513 may be the same.

It should be appreciated that certain embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled/connected with/to the other element directly (e.g., wiredly), wirelessly, or via a third element.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each element (e.g., a module or a program) of the above-described elements may include a single entity or multiple entities. According to certain embodiments, one or more of the above-described elements may be omitted, or one or more other elements may be added. Alternatively or additionally, a plurality of elements (e.g., modules or programs) may be integrated into a single element. In such a case, according to certain embodiments, the integrated element may still perform one or more functions of each of the plurality of elements in the same or similar manner as they are performed by a corresponding one of the plurality of elements before the integration. According to certain embodiments, operations performed by the module, the program, or another element may be carried out sequentially, in parallel, repeatedly, or heuristically, or one or more of the operations may be executed in a different order or omitted, or one or more other operations may be added.

The invention claimed is:

1. An in-house relay device, comprising:
support equipment configured to support the in-house relay device;
the support equipment including:
a vertical rod in a substantially vertical orientation,
a support member, disposed at one end of the vertical rod and coupled to the vertical rod, for supporting the in-house relay device, and
a fixing member coupled to the support member and configured to fixably couple the support member to a permeable outer wall,
wherein the in-house relay device for performs wireless communication with a repeater of a wireless communication service provider in an ultra-high frequency (mmWave) band, and
wherein the support member includes:
a base plate;
a first fixing plate rotatably coupled to the base plate;
a rotating plate rotatably coupled to the first fixing plate;
a second fixing plate rotatably coupled to the rotating plate and to the bottom surface of the in-house relay device;
a first knob for rotating the rotating plate about a z-axis direction provided on a side surface of the first fixing plate; and
a second knob for rotating the rotating plate about an x-axis direction perpendicular to the z-axis direction provided on a side surface of the second fixing plate.

2. The in-house relay device of claim 1, further comprising:
a first toothed rail coupled to a first gear of the first knob in a male and female coupling manner provided on a bottom surface of the rotating plate facing the first fixing plate, and
a second toothed rail coupled to a second gear of the second knob in a male and female coupling manner provided on an upper surface of the rotating plate facing the second fixing plate.

3. The in-house relay device of claim 2, wherein
the upper surface of the rotating plate includes a groove having a semi-circular column shape and disposed in the x-axis direction, and
the second toothed rail includes a plurality of peaks and valleys provided on the surface of the groove, the plurality of peaks and valleys being provided in the x-axis direction.

4. The in-house relay device of claim 1, wherein the fixing member includes
at least one bracket configured to be connected to a portion of the support member; and
an attachment member for fixing the bracket to a permeable outer wall or a wall surface,
the attachment member being at least one of a double-sided tape, a clamp, or an air absorber.

5. The in-house relay device of claim 1, wherein the vertical rod has a through-hole through which a power line and a communication line are received and connected to the in-house relay device.

6. The in-house relay device of claim 1, wherein the vertical rod includes an extension member for extending the length of the vertical rod in a z-axis direction.

7. The in-house relay device of claim 1, further comprising:
at least one proximity sensor disposed in the support member; and
a connection member electrically connecting the at least one proximity sensor and the in-house relay device.

8. The in-house relay device of claim 1, wherein
the in-house relay device includes;
at least one first antenna that performs a wireless communication at a first designated frequency;
at least one second antenna that performs a wireless communication at a second designated frequency;
at least one third antenna that performs a wireless communication at a third designated frequency;
a communication module electrically connected to the first to third antennas;
at least one proximity sensor; and
a controller electrically connected to the communication module and the proximity sensor, wherein
the controller is configured to reduce transmission power of at least one of the first to third antennas to a designated value or less when a human body is detected from a designated direction via the at least one proximity sensor.

9. The in-house relay device of claim 8, wherein the controller is further configured to reduce the transmission power of at least one of the first to third antennas to the designated value or less when the human body is detected from the designated direction via the at least one proximity sensor.

10. An in-house relay device, comprising:
    support equipment configured to support the in-house relay device;
    the support equipment including:
       a vertical rod in a substantially vertical orientation,
       a support member, disposed at one end of the vertical rod and coupled to the vertical rod, for supporting the in-house relay device, and
       a fixing member coupled to the support member and configured to fixably couple the support member to a permeable outer wall, and
       a first protrusion provided on an upper surface of the support member facing the bottom surface of the in-house relay device, and the first protrusion coupled to at least one of a plurality of insertion grooves provided on the bottom surface of the in-house relay device,
    wherein the in-house relay device for performs wireless communication with a repeater of a wireless communication service provider in an ultra-high frequency (mmWave) band, and
    wherein the support member includes:
    a base plate;
    a tilting plate configured to be loaded on the base plate, the tilting plate being coupled to the bottom surface of the in-house relay device; and
    a rotating plate configured to be loaded on the tilting plate, the rotating plate having a ring shape surrounding a lower side surface of the in-house relay device.

11. The in-house relay device of claim 10, further comprising:
    a second protrusion provided on an upper surface of the tilting plate facing the rotating plate, and
    a plurality of steps, coupled to the second protrusion, having different heights provided on the bottom surface of the rotating plate facing the tilting plate.

12. The in-house relay device of claim 10, wherein a handler for rotating the rotating plate protrudes from the upper surface of the rotating plate.

13. An in-house relay device, comprising:
    support equipment configured to support the in-house relay device;
    the support equipment including:
       a vertical rod in a substantially vertical orientation,
       a support member, disposed at one end of the vertical rod and coupled to the vertical rod, for supporting the in-house relay device, wherein the support member includes a rotating plate for adjusting a direction of the in-house relay device, and
       a fixing member coupled to the support member and configured to fixably couple the support member to a permeable outer wall, wherein the fixing member includes a wall fixing unit and a rotating arm configured to couple the wall fixing unit to the support member through the vertical rod, and
    wherein the in-house relay device for performs wireless communication with a repeater of a wireless communication service provider in an ultra-high frequency (mmWave) band.

* * * * *